(12) United States Patent
Mazor

(10) Patent No.: US 8,271,581 B2
(45) Date of Patent: *Sep. 18, 2012

(54) SYSTEM AND METHOD FOR PIN-TO-PIN NETWORK COMMUNICATIONS

(75) Inventor: Gadi Mazor, Ramat Efal (IL)

(73) Assignee: Onset Technology, Ltd., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/784,218

(22) Filed: May 20, 2010

(65) Prior Publication Data

US 2010/0227592 A1  Sep. 9, 2010

Related U.S. Application Data

(63) Continuation of application No. 10/892,243, filed on Jul. 16, 2004, now Pat. No. 7,743,156.

(60) Provisional application No. 60/488,005, filed on Jul. 18, 2003.

(51) Int. Cl.
- G06F 15/16 (2006.01)
- H04B 7/00 (2006.01)
- H04H 20/71 (2008.01)
- H04H 1/38 (2006.01)

(52) U.S. Cl. ........ 709/203; 709/206; 709/211; 370/277; 370/310; 455/3.01; 455/73

(58) Field of Classification Search .......... 709/203, 709/206, 211; 370/277, 310; 455/3.01, 73
See application file for complete search history.

(56) References Cited

U.S. PATENT DOCUMENTS

| | | | |
|---|---|---|---|
| 5,127,047 A | 6/1992 | Bell et al. | |
| 5,647,002 A | 7/1997 | Brunson | |
| 5,701,183 A * | 12/1997 | Bellemare et al. | 358/404 |
| 5,742,905 A | 4/1998 | Pepe et al. | |
| 5,758,088 A | 5/1998 | Bezaire et al. | |
| 5,767,985 A | 6/1998 | Yamamoto et al. | |
| 5,838,461 A | 11/1998 | Hsieh | |
| 5,875,305 A * | 2/1999 | Winter et al. | 709/231 |
| 5,903,723 A | 5/1999 | Beck et al. | |
| 5,903,833 A | 5/1999 | Jonsson et al. | |
| 5,948,059 A | 9/1999 | Woo et al. | |
| 6,091,947 A | 7/2000 | Sumner | |
| 6,157,706 A | 12/2000 | Rachelson | |
| 6,185,604 B1 | 2/2001 | Sekiguchi | |
| 6,219,694 B1 | 4/2001 | Lazaridis et al. | |

(Continued)

FOREIGN PATENT DOCUMENTS

JP  7-288668  10/1995

(Continued)

*Primary Examiner* — David Lazaro
*Assistant Examiner* — Vitali Korobov
(74) *Attorney, Agent, or Firm* — Pearl Cohen Zedek Latzer, LLP

(57) ABSTRACT

A system and method is provided for enabling wireless access to a computer network via communication between a remote (client) wireless device and a wireless device physically linked to the computer network. A bank of one or more wireless gateway devices may be cradled and connected to a network server. The wireless gateway devices may then act as a node on the wireless network, and remote wireless devices may send and receive messages to and from the wireless gateway devices using PIN-to-PIN messaging. The wireless gateway devices, when cradled, may communicate with any attached server or other network equipment, and may therefore act as a wireless gateway to the server or other network equipment.

17 Claims, 3 Drawing Sheets

U.S. PATENT DOCUMENTS

| | | |
|---|---|---|
| 6,233,430 B1 | 5/2001 | Helferich |
| 6,385,306 B1 | 5/2002 | Baxter, Jr. |
| 6,697,458 B1 | 2/2004 | Kunjibettu |
| 6,771,949 B1 | 8/2004 | Corliss |
| 6,842,628 B1 | 1/2005 | Arnold et al. |
| 6,865,680 B1 | 3/2005 | Wu et al. |
| 6,975,595 B2 * | 12/2005 | Peterson .................. 370/252 |
| 6,985,748 B2 | 1/2006 | Knotts |
| 7,003,304 B1 | 2/2006 | Helferich |
| 7,107,309 B1 | 9/2006 | Geddes et al. |
| 7,286,650 B2 | 10/2007 | Pantana et al. |
| 7,359,364 B2 | 4/2008 | Yuhan et al. |
| 7,743,156 B2 * | 6/2010 | Mazor ....................... 709/228 |
| 2001/0019951 A1 | 9/2001 | Haumont et al. |
| 2002/0131397 A1 | 9/2002 | Patel et al. |
| 2002/0194279 A1 | 12/2002 | Chern |
| 2003/0099341 A1 | 5/2003 | Williams |
| 2003/0104827 A1 | 6/2003 | Moran et al. |
| 2003/0140146 A1 | 7/2003 | Akers et al. |
| 2003/0190887 A1 | 10/2003 | Hook et al. |
| 2003/0200264 A1 | 10/2003 | Brill |
| 2004/0105536 A1 | 6/2004 | Williams |
| 2004/0111475 A1 | 6/2004 | Schultz |
| 2004/0128509 A1 | 7/2004 | Gehrmann |
| 2004/0131161 A1 * | 7/2004 | Schwartz et al. ........... 379/68 |
| 2004/0148357 A1 | 7/2004 | Corrigan et al. |
| 2004/0180621 A1 | 9/2004 | Fowler |
| 2004/0198351 A1 * | 10/2004 | Knotts ................... 455/432.1 |
| 2004/0259531 A1 | 12/2004 | Wood et al. |
| 2005/0076082 A1 | 4/2005 | Le Pennec et al. |
| 2005/0078660 A1 | 4/2005 | Wood |
| 2005/0245239 A1 | 11/2005 | Haumont et al. |
| 2006/0125619 A1 * | 6/2006 | Calvi et al. ................ 340/500 |
| 2007/0019561 A1 * | 1/2007 | Peterson ................... 370/252 |
| 2007/0149115 A1 | 6/2007 | White et al. |
| 2008/0043676 A1 * | 2/2008 | Mousseau et al. ......... 370/331 |
| 2010/0268690 A1 * | 10/2010 | Anderson et al. ........... 707/661 |

FOREIGN PATENT DOCUMENTS

| | | |
|---|---|---|
| JP | 10-327185 | 12/1998 |

* cited by examiner

SYSTEM AND METHOD FOR PIN-TO-PIN NETWORK COMMUNICATIONS

CROSS-REFERENCE TO RELATED APPLICATIONS

This application is a continuation of U.S. patent application Ser. No. 10/892,243, entitled "System and Method for PIN-to-PIN Network Communications," filed Jul. 16, 2004, now U.S. Pat. No. 7,743,156 which claims the benefit of U.S. Provisional Patent Application Ser. No. 60/488,005, entitled "System and Method for Wireless PIN-to-PIN Network Communications," filed Jul. 18, 2003, the contents of which are hereby incorporated by reference in their entirety.

FIELD OF THE INVENTION

This invention relates to a system and method for enabling wireless access to a computer network via communication between a remote (client) wireless device and a wireless device physically linked to the computer network.

BACKGROUND OF THE INVENTION

Wireless computing devices such as, for example, the BlackBerry™ hand-held device by Research in Motion Limited, typically provide users with wireless access to important enterprise information. System infrastructures (or architectures) supporting such devices may generally comprise a wireless network, a carrier gateway, an enterprise gateway (e.g., the BlackBerry™ Enterprise Server or "BES"), and other back-end servers (e.g., Exchange, DB systems, document management systems, etc.), or other components.

Wireless servers, such as Onset Technology's METAmessage server, may be provided to further enhance the features and functionality of known wireless systems (such as the BlackBerry™ system) by enabling users to access and manage information—data from document management programs, voicemail, SQL/ODBC databases, and CRM/ERP applications, email attachments, network files, web pages, contact information, etc.—from their wireless device.

In disaster scenarios, such as that of Sep. 11, 2001, various components of a system infrastructure necessary to access important enterprise information from a wireless device may become unavailable. Connectivity to an enterprise may be lost, or back end systems such as BES and Exchange may not function. While wireless devices and wireless networks (e.g., the pager Mobitex and DataTAC networks) may operate, as was the case on Sep. 11, 2001, they may still be ineffective if other components of the system infrastructure do not function.

Certain wireless devices have a dedicated device number or personal identification number ("PIN"), which may serve as the device's identifier on a network. PINs also enable wireless devices on a network to communicate with one another via PIN-to-PIN messaging (i.e., messages communication from one PIN identifier to another PIN identifier). This form of communication may occur from device to device through the wireless network, and without the need for a carrier gateway, enterprise gateway, or other system or server. This form of communication may also be quite valuable in the event of a disaster or other scenario if various components of a system infrastructure are compromised. One drawback associated with PIN-to-PIN messaging, however, is that a user must typically know the PIN address of the wireless device of a user that he or she wishes to communicate with. This may be an unlikely occurrence, as most users tend to remember e-mail addresses and/or telephone numbers for contacts, and not the PIN addresses of their wireless devices. These and other drawbacks exist.

SUMMARY OF THE INVENTION

The invention solving these and other problems relates to a system and method for enabling wireless access to a computer network via communication between a remote (client) wireless device and a wireless device physically linked to the computer network.

One embodiment of the invention enables users to retrieve the personal identification number ("PIN") addresses of other wireless devices, as well as interact with designated database systems, file directories, or other back end systems, even if portions of the system infrastructure are unavailable.

According to an embodiment of the invention, a bank of one or more wireless devices may be cradled and connected to the network, a METAmessage server provided by Onset Technology, Inc., or other back-end server. For convenience, these cradled devices will be referred to herein as "wireless gateway devices." The wireless gateway devices may then act as a node on the wireless network, and remote wireless devices may send and receive messages to and from the wireless gateway devices using PIN-to-PIN messaging. The wireless gateway devices, when cradled, may communicate with any attached server or other network equipment, and may therefore act as a wireless gateway to the server or other network equipment. Accordingly, one or more components of the system architecture that may be unavailable may be bypassed, and a direct link from the devices to the network equipment may be provided.

According to one embodiment, the addresses of the wireless gateway devices may be stored in a remote wireless device, or may be transmitted in case of emergency to the remote wireless device through a PIN-to-PIN message. The remote wireless device, which typically communicates with the enterprise systems through email or other data channels, may switch to PIN-to-PIN messaging either manually, through operation of the user, or automatically, in response to a received PIN-to-PIN message. The remote wireless device may store multiple addresses of wireless gateway devices, and may send each communication to more than one of those wireless gateway devices, for redundancy purposes. According to one embodiment, multiple METAmessage servers may be provided in different locations, to further make the solution redundant. The wireless gateway devices may be served by different wireless networks, for further redundancy.

According to an embodiment of the invention, a user of a remote wireless device may have access to any information on the METAmessage (or other) server, or on any devices connected to it. As one example, a fax server provided with (or connected to) the METAmessage server, or even just a fax card, may provide the additional functionality of enabling users to print any of the information to any fax machine. This further enhances the solution to support lengthy documents that may not be easily read on the remote wireless device.

These and other objects, features, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION OF PREFERRED EMBODIMENTS

Figure 1:
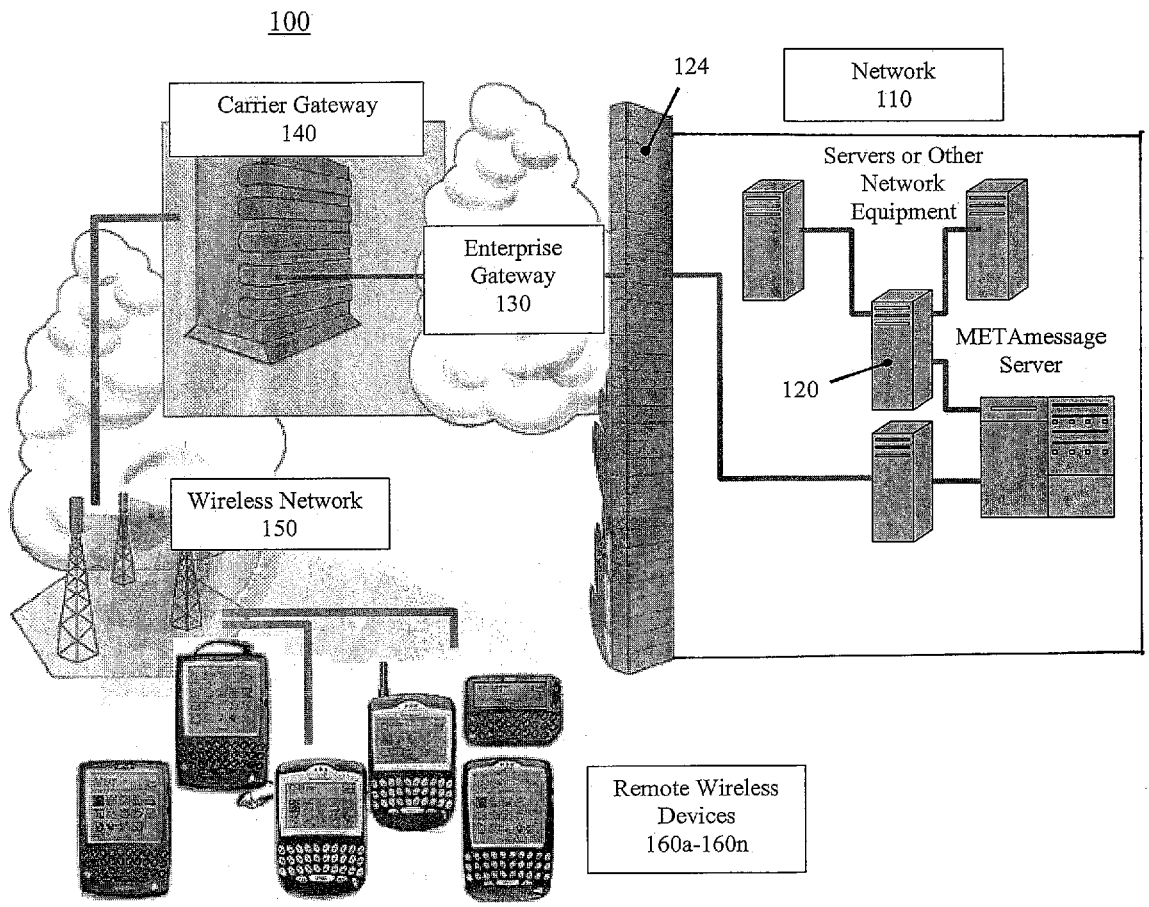
FIG. 1 illustrates a wireless system infrastructure (or architecture) supporting communication from wireless devices to an enterprise or other network through carrier and enterprise gateways.

With regard to FIG. 1, a system infrastructure 100 (or architecture) is illustrated for supporting one or more remote wireless devices (160a-160n). A remote wireless device (160a-160n) may include any device capable of sending and receiving information through a wireless network including, but not limited to, a Blackberry™ personal digital assistant (PDA), pager, laptop, cell phone, or other wireless device. System infrastructure 100 may comprise a wireless network 150 (e.g., the pager Mobitex or DataTAC networks, etc.), a carrier gateway 140, an enterprise gateway 130 (e.g., the BlackBerry™ Enterprise Server), and a computer network 110 (e.g., a corporate or other network). In some embodiments, a firewall 124 may be provided to prevent unauthorized access to or from computer network 110.

Computer network 110 may further comprise one or more "back-end" servers (e.g., a Microsoft Exchange server), database systems, document management systems, or other servers or components. As an example, a wireless server 120, such as Onset Technology's METAmessage server, may be provided to enable users to access and manage information—data from document management programs, voicemail, SQL/ODBC databases, and CRM/ERP applications, email attachments, network files, web pages, contact information, etc.—from their respective wireless device (160a-160n).

In the event that system infrastructure 100 is disrupted (e.g., there is a loss of ability to communicate with "back-end" servers through carrier gateway 140 and/or enterprise gateway 130), an embodiment of the invention enables remote wireless devices (160a-160n) themselves to be used to facilitate communication with back end servers or other network equipment.

Figure 2:
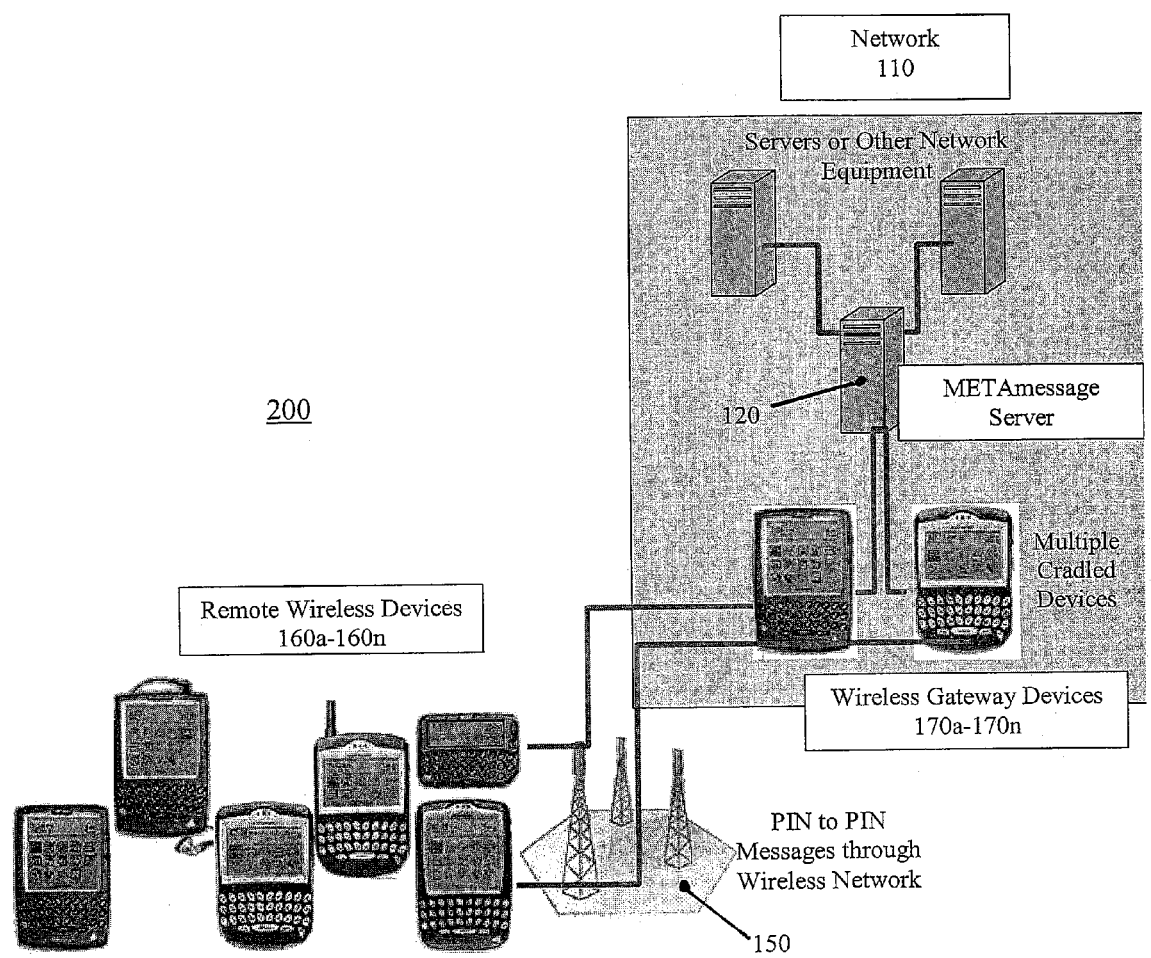
FIG. 2 is an exemplary illustration of a system architecture for enabling PIN-to-PIN communication between remote wireless devices to facilitate continued transmission of information during or after a disaster or disruptive event, according to an embodiment of the invention.

According to an embodiment of the invention illustrated in FIG. 2, an exemplary illustration of a system infrastructure 200 (or architecture) is provided for enabling wireless access to computer network 110 via communication between remote wireless devices (160a-160n) and one or more wireless gateway devices (170a-170n) physically linked to computer network 110.

In one implementation, PIN-to-PIN messaging may be used to bypass one or more components of system infrastructure 200. As recited above, PIN-to-PIN messaging refers to the transmission of information from one remote wireless device (e.g., 160a-160n) to another (e.g., 160a-160n-or-170a-170n) over a wireless network 150. This communication may be accomplished through the use of dedicated personal identification number ("PIN") identifiers (or addresses) associated with wireless devices (i.e., communicating message from one PIN identifier or address to another PIN identifier or address). PIN identifiers may comprise any indicator that serves to identify a particular wireless device on a wireless network. Wireless network 150 may comprise any known network including, but not limited to, Mobitex, DataTAC, or GPRS. Those having skill in the art understand that the nature of wireless devices is such that any particular wireless device may act as both a transmitter or a receiver.

PIN-to-PIN messages are not limited to those sent over the BlackBerry™ pager network (e.g., Mobitex and DataTAC). They may include other types of messages that are sent from one device to another device, bypassing the carrier to enterprise link. For example, SMS messages used by cell phones are also PIN-to-PIN messages.

According to an embodiment of the invention, PIN-to-PIN messaging may be used to bypass traditional network infrastructure via one or more wireless gateway devices (170a-170n). Similar to remote wireless devices (160a-160n), a wireless gateway device (170a-170n) may include any device capable of sending and receiving information through a wireless network including, but not limited to, a Blackberry™, personal digital assistant (PDA), pager, laptop, cell phone, or other wireless device.

According to an embodiment, a wireless gateway device (170a-170n) may be connected to one or more components of computer network 110 via a cradle or other similar mechanism. A cradle may comprise any device capable of physically connecting the circuitry of one electronic device (e.g., a wireless gateway device 170a-170n) to the circuitry of another electronic device (e.g., a wireless server 120). In one implementation, wireless server 120 may be serially connected to one or more cradled wireless gateway devices (170a-170n). Wireless server 120 may further either host or connect to any number of other servers, databases, or information sources such as, for example, a contact information database, emergency procedure files, or other enterprise applications.

According to an embodiment of the invention, wireless server 120 may comprise a METAmessage server provided by Onset Technology, Inc. As recited above, a METAmessage server may enhance the features and functionality of known wireless systems (such as the BlackBerry™ system) by enabling users to access and manage information—data from document management programs, voicemail, SQL/ODBC databases, and CRM/ERP applications, email attachments, network files, web pages, contact information, etc.—from their wireless device.

To increase the reliability of PIN-to-PIN messaging, and/or PIN-to-PIN access to computer network 110 (or to another network or enterprise), multiple wireless gateway devices (170a-170n) may be cradled and used for transmitting information to and from remote wireless devices (160a-160n) in the event that one or more of the wireless gateway devices (170a-170n) becomes inoperable or inaccessible. Further, multiple wireless servers 120 (or other servers) with accompanying wireless gateway devices may be placed in multiple locations to increase the redundancy of the system. Redundancy may be yet further increased by using multiple wireless networks 150 for the transmission of PIN-to-PIN messages between remote wireless devices (160a-160n) and wireless gateway devices (170a-170n). If the wireless networks of one or more wireless gateway devices become inoperable, inaccessible, or otherwise unavailable, for any reason, wireless gateway devices operating on other wireless networks may take their place.

Having provided an overview of various embodiments of system infrastructure 200, a description of the various features and functionalities of the invention with regard to PIN-to-PIN messaging, and/or PIN-to-PIN access to a computer network or networks will now be described. It should be understood that wireless server 120, remote wireless devices (160a-160n), wireless gateway devices (170a-170n), or other servers or components of system infrastructure 200 may include various software modules to accomplish the functionalities described herein. In other embodiments, as would be appreciated, the functionalities described herein may be implemented in various combinations of hardware and/or firmware, in addition to, or instead of, software.

According to an embodiment of the invention, users of remote wireless devices (160a-160n) may elect whether to use the PIN-to-PIN function of the device for either PIN-to-PIN messaging or PIN-to-PIN access to a component (e.g., a server) of computer network 110. If this function is elected, a user needs to know or should be able to conveniently access the PIN address of a target device or system component.

In one embodiment, if PIN-to-PIN messaging is desired or needed to bypass unavailable components of system infrastructure 200, wireless gateway devices (170a-170n) may send initial PIN-to-PIN messages to remote wireless devices (160a-160n) to provide the devices with the PIN identifiers (or addresses) for one or more of wireless gateway devices (170a-170n). The initial PIN-to-PIN messages may also be used to alert users of the need (e.g., in case of an emergency) to switch to PIN-to-PIN communication. PIN addresses of one or more wireless gateway devices (170a-170n) needed for access to computer network 110 may also be stored on the remote wireless devices (160a-160n) and may be updated wirelessly from wireless server 120 (e.g., a METAmessage server) or from another server.

According to an embodiment of the invention, when one or more components of a traditional infrastructure (e.g., carrier gateway 140 or enterprise gateway 130 of system infrastructure 100 in FIG. 1) becomes unavailable, PIN-to-PIN communication may be initiated manually by the users of remote wireless devices (160a-160n).

In an alternative embodiment of the invention, remote wireless devices (160a-160n) may be automatically switched to PIN-to-PIN communication through, for example, a PIN-to-PIN message sent by wireless server 120 or other server. Client software on remote wireless devices (160a-160n) may monitor incoming messages and, when such a switching message arrives, switch the sending (or other communications) protocol of the device to PIN-to-PIN mode.

In some embodiments of the invention, a "notification" module may be located on wireless server 120 or on another server of computer network 110. The notification module may store the PIN addresses of one or more remote wireless devices (160a-160n) and wireless gateway devices (170a-170n) on the network. The notification module may also facilitate notification to remote wireless device users that PIN-to-PIN communication is necessary (e.g., if one or more components of the system infrastructure becomes unavailable).

The notification module may also facilitate the distribution and maintenance of wireless gateway PIN addresses to remote wireless devices (160a-160n). Furthermore, the notification module may facilitate an automatic "switch" of remote wireless devices from normal communication to a PIN-to-PIN communication mode. The PIN addresses of remote wireless devices (160a-160n) and wireless gateway devices (170a-170n) may be changed or updated in the event that devices of any kind are added to, or removed from, the system. The notification module may also facilitate the determination of wireless gateway device availability.

According to one embodiment, remote wireless devices (160a-160n) may enable users to choose the wireless gateway devices (170a-170n) with which to communicate. Alternatively, the remote wireless devices (160a-160n) may automatically select particular wireless gateway devices (170a-170n) according to their type and/or availability, the type and/or availability of the wireless network 150, or other criteria. Remote wireless devices (160a-160n) may send single communications to an enterprise or other network through multiple wireless gateway devices simultaneously, further increasing system redundancy.

It should be understood from the various embodiments described above that for either PIN-to-PIN messaging or PIN-to-PIN access to a component (e.g., a server) of computer network 110, a user should be able to conveniently access the PIN address of a target device or system component. As such, in various embodiments, PIN addresses may be stored on either one or more of wireless server 120 (e.g., a METAmessage server) or other servers of computer network 110, on one or more of wireless gateway devices (170a-170n), or in the address books (or other directory files) stored on remote wireless devices (160a-160n). As recited above, in those embodiments wherein PIN addresses are stored on remote wireless devices (160a-160n), the addresses may be updated wirelessly from wireless server 120 (e.g., a METAmessage server) or from another server, from wireless gateway devices (170a-170n), or even from other remote wireless devices (160a-160n). Alternative configurations may be implemented.

According to one embodiment, a PIN look-up feature may be provided enabling users to automatically update the address books of their remote wireless device with PIN addresses. A user may send a request with a partial name or initials (or other information) for a contact for which information is desired, and either wireless server 120, wireless gateway devices (170a-170n), or other system servers or components may then reply with the desired contact information, and/or an option to update the user's handheld address book. Multiple matches may be accommodated by enabling a user to choose from a list of possible matches. If an identified contact has a PIN registered on the network, the PIN may be included with the contact information. In various implementations, access to contact information may be dependent upon on a user's network access rights, or subject to a security protocol.

According to an embodiment of the invention, a PIN update feature may be enabled. With Automatic PIN Updating, a user may request PINs for every user on the network. An administrator may configure wireless server 120 (or other server) to either update only existing address book entries for a user, or to update existing entries and add entries that exist on the network but that are not yet in the user's address book.

According to an embodiment of the invention, PIN-to-PIN archiving functionality may be provided. As an example, administrators in sensitive sectors often disable PIN-to-PIN messaging due to regulations requiring that all messages such as e-mail be recorded or archived. In such instances, handheld wireless devices may be left unused in an emergency if the email server or other network infrastructure were down. According to an embodiment, wireless server 120 (or another system component) may enable administrators to archive PIN-to-PIN messages as a default protocol under normal conditions such that, in an emergency, the feature is enabled and handhelds are available for emergency communications. Upon sending a PIN message, content including "To:, CC:, and BCC:" information may be copied and sent via e-mail to a pre-determined address selected by an administrator or other individual. The message may then be processed with whatever method or tool that is configured by the administrator.

According to an embodiment of the invention, a "message blast" feature may be enabled. In an emergency, messages often have to go out to special categories of workers. As an example, one notification may be transmitted to all office managers, while another message may be sent to field personnel, etc. Since these individuals may utilize a variety of devices (e.g., BlackBerry handhelds using email or PIN-to-PIN messaging, pocket PCs, cell phones, desktop PCs, even fax machines), wireless server 120 (e.g., a METAmessage server) may enable, for example, a BlackBerry user to send one message to many addressees regardless of their device. The user may have access to three types of groups: a group of addresses created by an administrator; an existing BlackBerry Address Book group; and, a manually entered group. After selecting a group, a user may compose and send a message.

According to an embodiment of the invention, an "instant conference call" feature may be enabled for those users whose remote wireless device (160a-160n) is voice-enabled. This feature may enable a user to quickly set up a conference call by choosing from a list of pre-defined groups on, for example, their BlackBerry handheld, by selecting participants from the address book, or by entering new numbers. Working with either a local or hosted voice gateway, wireless server 120 may call and connects the intended participants, including the initiating user.

Figure 3:
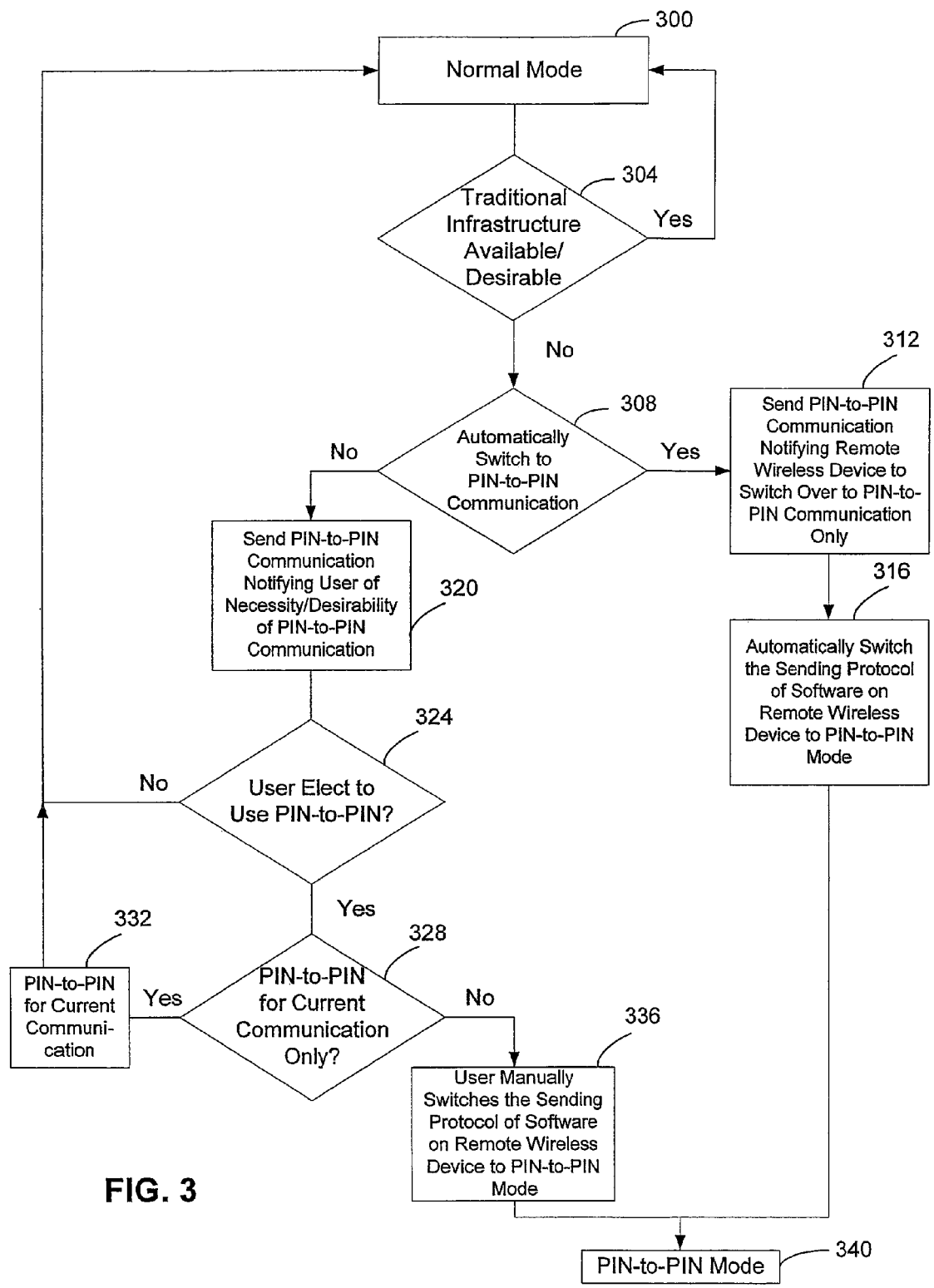
FIG. 3 illustrates a flowchart of processing according to the invention, in one regard.

In addition to the foregoing description, FIG. 3 illustrates a flowchart of processing according to the invention, in one regard. The following operations may be accomplished using all or some of the of the system components described in detail above, and may incorporate all of the features and functionality of the invention as set forth in the foregoing description and accompanying drawing figures.

In an operation 300, a wireless system infrastructure (or architecture) supporting communication from wireless devices to an enterprise or other network through carrier and enterprise gateways, for example, may be functioning normally.

In an operation 304, a determination may be made as to whether the wireless system infrastructure (or architecture) is available and functioning properly. If the system is functioning properly, it may be said to be in a "normal mode." If, however, it is determined in operation 304 that an emergency or other event (or series of events) has resulted in one or more components of the wireless system infrastructure (or architecture) becoming unavailable, or if use of the wireless system infrastructure is undesirable, a determination may be made, in an operation 308, as to whether remote wireless devices may be automatically switched to PIN-to-PIN communication.

If it is determined in operation 308 that remote wireless devices should automatically be switched to PIN-to-PIN communication, a PIN-to-PIN communication may be sent by a server, wireless gateway device, or other server or device to a user's remote wireless device in an operation 312. Client software on the remote wireless device may monitor incoming messages and, when such a switching message arrives, switch the sending (or other communications) protocol of the device to PIN-to-PIN mode (340) in an operation 316.

By contrast, if it is determined in operation 308 that an automatic switch to PIN-to-PIN mode may not be required, a PIN-to-PIN communication may be sent by a server, wireless gateway device, or other server or device to a user's remote wireless device, in an operation 320, notifying the user of the necessity or desirability of enabling PIN-to-PIN messaging or PIN-to-PIN access to a component (e.g., a server) of computer network.

In an operation 324, a determination may be made by a user as to whether to initiate PIN-to-PIN communication. If a user elects to initiate PIN-to-PIN communication, a determination may be made in an operation 328 as to whether PIN-to-PIN messaging or other PIN-to-PIN communication may be used only for a current communication (e.g., a user needs to send one e-mail message).

If it is determined, in operation 328, that PIN-to-PIN messaging or other PIN-to-PIN communication is to be used only for a current communication, then such a communication may occur in an operation 332. By contrast, if it is determined that PIN-to-PIN communication should be enabled for a longer period of time, PIN-to-PIN communication may be initiated manually by a user in an operation 336.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for archiving messages transmitted from a mobile wireless device, comprising:
   transmitting a PIN-to-PIN (personal identification number-to-personal identification number) message from the mobile wireless device to an intended destination;
   determining, by the mobile wireless device, whether the message is to be archived; and
   transmitting, by the mobile wireless device, an email message including content of the message to a predetermined archive destination that is different and remote from the mobile wireless device in response to the mobile wireless device determining that the message is to be archived, wherein the archive destination is configured to archive the content transmitted by the mobile wireless device.

2. The method of claim 1, further comprising identifying, by the mobile wireless device, an email address for the archive destination, wherein the mobile wireless device transmits the content of the message to the email address for the archive destination.

3. The method of claim 1, further comprising receiving, by the mobile wireless device, an indicator from a wireless server that indicates that the message is to be archived, wherein the mobile wireless device determines that the message is to be archived in response to receiving the indicator from the wireless server.

4. The method of claim 1, wherein the content of the message transmitted by the mobile wireless device includes one or more of a recipient of the message, a carbon copy recipient of the message, or a blind carbon copy recipient of the message.

5. The method of claim 1, wherein the intended destination of the message is a second mobile wireless device.

6. The method of claim 5, wherein the message is a PIN-to-PIN (personal identification number-to-personal identification number) message, and wherein the intended destination of the PIN-to-PIN message is a PIN address uniquely identifying the second mobile wireless device.

7. The method of claim 5, wherein the message is an SMS message, and wherein the intended destination of the SMS message is an address uniquely identifying the second mobile wireless device.

8. The method of claim 1, wherein a default configuration of the mobile wireless device causes the mobile wireless device to archive the message, and wherein the mobile wireless device determines that the message is to be archived unless the mobile wireless device receives an indicator that modifies the default configuration of the mobile wireless device.

9. The method of claim 1, wherein a client application executing on the mobile wireless device is configured to detect that the message is being transmitted, determine whether the message is to be archived, and transmit the content of the message to the predetermined archive destination.

10. A system for archiving messages transmitted from a mobile wireless device, the system comprising a mobile wireless device that executes a client application, wherein executing the client application on the mobile wireless device causes the mobile wireless device to:

transmit a PIN-to-PIN (personal identification number-to-personal identification number) message from the mobile wireless device to an intended destination;

determine whether the message is to be archived; and transmit an email message including content of the message to a predetermined archive destination that is different and remote from the mobile wireless device in response to determining that the message is to be archived, wherein the archive destination is configured to archive the content transmitted by the client application executing on the mobile wireless device.

11. The system of claim 10, wherein executing the client application on the mobile wireless device further causes the mobile wireless device to: identify an email address for the archive destination; and transmit the content of the message to the email address for the archive destination.

12. The system of claim 10, wherein executing the client application on the mobile wireless device further causes the mobile wireless device to: receive an indicator from a wireless server that indicates that the message is to be archived; and determine that the message is to be archived in response to receiving the indicator from the wireless server.

13. The system of claim 10, wherein the content of the message transmitted by the mobile wireless device includes one or more of a recipient of the message, a carbon copy recipient of the message, or a blind carbon copy recipient of the message.

14. The system of claim 10, wherein the intended destination of the message is a second mobile wireless device.

15. The system of claim 14, wherein the message is a PIN-to-PIN (personal identification number-to-personal identification number) message, and wherein the intended destination of the PIN-to-PIN message is a PIN address uniquely identifying the second mobile wireless device.

16. The system of claim 14, wherein the message is an SMS message, and wherein the intended destination of the SMS message is an address uniquely identifying the second mobile wireless device.

17. The system of claim 10, wherein a default configuration of the mobile wireless device causes the mobile wireless device to archive the message, and wherein the mobile wireless device determines that the message is to be archived unless the mobile wireless device receives an indicator that modifies the default configuration of the mobile wireless device.

* * * * *